United States Patent

Hegar et al.

[11] 3,755,287
[45] Aug. 28, 1973

[54] HETEROCYCLIC DISAZO DYESTUFFS CONTAINING A BRIDGING GROUP AND AT LEAST ONE QUATERNARY AMMONIUM GROUP

[75] Inventors: Gert Hegar, Schoenenbuch; Hans-Joerg Angliker, Riehen; Richard Peter, Basel, all of Switzerland

[73] Assignee: Ciba-Geigy AG, Basel, Switzerland

[22] Filed: May 19, 1971

[21] Appl. No.: 145,005

Related U.S. Application Data

[63] Continuation-in-part of Ser. No. 730,943, May 21, 1968, Pat. No. 3,635,940.

[30] Foreign Application Priority Data

May 29, 1967 Switzerland.......................... 7532/67

[52] U.S. Cl................. 260/155, 260/152, 260/156, 260/157, 260/158, 260/160, 260/163
[51] Int. Cl. ....................... C09b 33/06, D06p 1/02
[58] Field of Search.................. 260/155, 260/156, 157, 158, 166, 161

[56] References Cited
UNITED STATES PATENTS

| | | | |
|---|---|---|---|
| 3,635,940 | 1/1972 | Hegar et al. .......................... | 260/155 |
| 2,263,994 | 11/1941 | Knight ................................. | 260/160 |
| 2,286,391 | 6/1942 | Sparks ................................. | 260/154 |
| 2,734,053 | 2/1956 | Grandjean et al. .................. | 260/147 |
| 2,813,856 | 11/1957 | Steinemann et al. ................ | 260/174 |
| 2,879,265 | 3/1959 | Steinemann ......................... | 260/147 |
| 2,945,849 | 7/1960 | Kruckenberg et al. .............. | 260/185 |
| 3,271,383 | 9/1966 | Yamaya et al........................ | 260/158 |
| 3,291,788 | 12/1966 | Yamaya et al........................ | 260/157 |

*Primary Examiner*—Floyd D. Higel
*Attorney*—Harry Goldsmith, Joseph G. Kolodny and Mario A. Monaco

[57] ABSTRACT

Disazo compounds in which two monoazo dyestuff molecules of the general formula

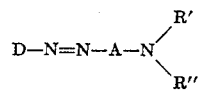

in which D represents the residue of heterocyclic diazo component, A represents an arylene residue and R' and R'' each represents an alkyl residue, are linked together via their coupling components through a bifunctional bridging group Z which has no dyestuff characteristics and which contains at least one quaternated nitrogen atom. The compounds are used for dyeing synthetic fibers such as polyvinyl chloride and demonstrate good light and washing fastness.

7 Claims, No Drawings

HETEROCYCLIC DISAZO DYESTUFFS CONTAINING A BRIDGING GROUP AND AT LEAST ONE QUATERNARY AMMONIUM GROUP

CROSS-REFERENCE TO A RELATED APPLICATION

This application is a continuation in part of application Ser. No. 730,943, filed May 21, 1968; and now U.S. Pat. No. 3,635,940.

The present invention provides new and valuable disazo compounds in which two monoazo dyestuff molecules of the general formula

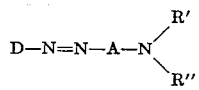

in which D represents the residue of a monocyclic or bicyclic diazo component, A represents an arylene residue and R' and R" each represents an alkyl residue, are linked together via their coupling components through a bifunctional bridging group Z which has no dyestuff characteristics and which contains at least one quaternated nitrogen atom. Generally, the symbol A stands for a 1,4-phenylene residue.

Accordingly, the invention provides, for example, disazo compounds of the formula

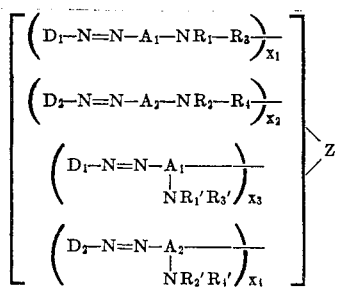

in which $x_1$, $x_2$, $x_3$ and $x_4$ each represents zero or 1 and $x_1 + x_2 + x_3 + x_4 = 2$; $R_1$, $R_2$, $R'_1$, $R'_2$, $R'_3$ and $R'_4$ each represents a hydrogen atom or preferably an alkyl group that may be substituted and in which when $x_1 = 1$ and/or $x_2 = 1$, $R_1$ may be bound to the residue $A_1$ to form a ring and/or $R_1$ may be bound to the residue $A_2$ to form a ring; $R_3$ and $R_4$ each represents an alkylene group that may be substituted; $A_1$ and $A_2$ each represents a phenylene residue that may be substituted and in which the azo group and the secondary or tertiary amino group are in 1,4-position to each other; $D_1$ and $D_2$ each represents the residue of a monocyclic or bicyclic diazo component and Z represents a bifunctional bridging group which has no dyestuff characteristics and which contains at least one quaternated nitrogen atom.

The invention may be further defined as follows: a disazo compound as shown in the formula on page 2, line 14, in which $X_1$, $X_2$, $X_3$ and $X_4$ each represents zero or 1 and $X_1 + X_2 + X_3 + X_4 = 2$; $R_1$, $R_2$, $R'_1$, $R'_2$, $R'_3$ and $R'_4$ each represents alkyl containing up to 10 carbon atoms or alkyl containing up to 10 carbon atoms substituted by a member selected from the group consisting of chlorine, bromine, phenyl, phenoxy, $C_1$-$C_{10}$-fatty acid acyloxy, $C_1$-$C_{10}$-fatty acid acylamino, cyano, $C_1$-$C_4$-alkoxy, benzoyl, cyanethoxy, $C_2$-$C_7$-alkylcarbamoyl, aminocarbonyl and $C_2$-$C_7$-alkylocycarbonyloxy, and when said $R_1$ is bound to $A_1$ forms a tetrahydro-quinoline ring and when said $R_2$ is bound to $A_2$ forms a tetrahydro-quinoline ring; $R_3$ and $R_4$ each is alkylene of up to three carbon atoms or a group of the formula

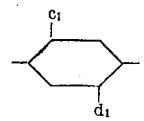

wherein Ac represents alkanoyl of up to five carbon atoms, benzoyl, stearoyl, phenoxycarbonyl, carbonyl, alkoxy containing up to five carbon atoms, phenylaminocarbonyl or methylaminocarbonyl; $A_1$ and $A_2$ each is a phenylene group of the formula

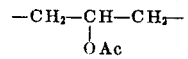

wherein $c_1$ and $d_1$ each represents hydrogen, $C_{1-2}$-alkyl, $C_{1-2}$-alkoxy, fatty acid acylamino containing up to five carbon atoms, phenoxycarbonylamino, or $C_1$-$C_4$-alkoxy-carbonylamino or aminocarbonylamino; the azo group and the dialkylamino group in said formula are attached in para-position to each other; $D_1$ and $D_2$ each represents the residue of a diazo component of the heterocyclic series and Z is selected from the group consisting of 1. a residue of the formula $$-NH-CO-Z'-CO-NH-$$

wherein Z' is a heterocyclic containing up to six carbon atoms and containing nitrogen, 2. a group selected from the formula

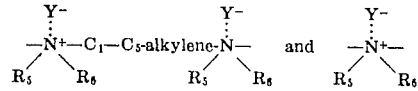

in which $Y^-$ represents an anion and $R_5$ and $R_6$ together each are $C_1$-$C_5$-alkyl or form an alkylene chain that may be interrupted by a hetero atom selected from the group consisting of nitrogen, oxygen and sulfur and contains up to five carbon atoms; and more particularly compounds of said formula wherein $X_1$, $X_2$, $X_3$ and $X_4$ each represents zero or 1 and $X_1 + X_2 + X_3 + X_4 = 2$; $R_1$, $R_2$, $R'_1$, $R'_2$, $R'_3$ and $R'_4$ each represents alkyl of up to four carbon atoms, or alkyl containing up to four carbon atoms, substituted by a member selected from the group consisting of chlorine, bromine, phenyl, phenoxy, $C_1$-$C_{10}$-fatty acid acyloxy, $C_1$-$C_{10}$-fatty acid acylamino, cyano, $C_1$-$C_4$-alkoxy, benzoyl, cyanethoxy, and when said $R_1$ is bound to $A_1$ forms a tetrahydro-quinoline ring and when said $R_2$ is bound to $A_2$ forms a tetrahydro-quinoline ring; $R_3$ and $R_4$ each is alkylene of up to three carbon atoms or alkylene substituted with alkylcarbonyl oxy containing up to three carbon atoms; $A_1$ and $A_2$ each is phenylene or phenylene substituted with methyl, methoxy, chlorine or acetylamino; the azo group and the dialkylamino group in said formula are attached in para-position to each other; $D_1$ and $D_2$ each represents the residue of a diazo component of the heterocycl cyclic series and Z is selected from the group consisting of 1. a residue of the formula

—NH—CO—Z'—CO—NH— wherein Z' is a heterocyclic containing up to six carbon atoms, and containing nitrogen, 2. a group selected from the formulae

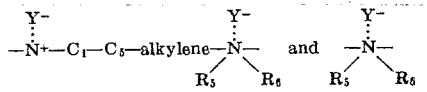

in which $Y^-$ represents an anion and $R_5$ and $R_6$ together form an alkylene chain that may be interrupted by a hetero atom selected from the group consisting of nitrogen, oxygen and sulfur, and contains up to five carbon atoms.

3. when $R_1$ and $R_2$ form a part of a tetrahydroquinoline structure, or when $X_3$ or $X_4$ is 1, or when $R_3$ and $R_4$ are β-acetoxy-propylene, Z is a group of the formula

wherein $R'_5$ and $R'_6$ are $C_1$-$C_5$-alkyl, or a group of the formula

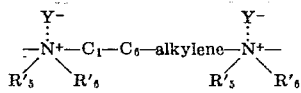

The bridging group Z may contain cycloammonium or alkylammonium groups, for example, a group of the formula

in which $Y^-$ represents an anion and $R_5$ and $R_6$ each represents an alkyl, aralkyl or cycloalkyl group, and in which $R_5$ and $R_6$ together may form an alkylene chain that may be interrupted by a hetero atom or part of an aromatic ring.

The dyestuffs of the invention are generally free from carboxylic and sulphonic acid groups. The diazo residues $D_1$ nd $D_2$ may be identical or different and are principally derivatives of monocyclic or bicyclic amines or any diazotizable heterocyclic amine which is free from acidic substituents imparting solubility in water, but especially amines containing a five-membered heterocyclic ring having two or three hetero atoms, especially one nitrogen atom and one or two sulphur, oxygen or nitrogen atoms, and aminobenzenes, especially those of the formula

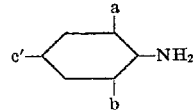

in which a represents a hydrogen or a halogen atom or an alkyl, alkoxy, nitro, cyano, carbalkoxy or alkylsulphone group, b represents a hydrogen or a halogen atom or an alkyl, cyano or trifluoromethyl group and c' represents a nitro, cyano, carbalkoxy or alkylsulphonyl group.

The diazo residues according to the invention generally correspond to the formula

A–NH$_2$ wherein A is a residue of a diazo component of the thiazole, benzothiazole, pyrazole, thiophene, thiadiazole, imidazole, thiazole, benzoimidazole, pyridine, benzoisothiazole, isothiazole or indazole series.

More particularly, the diazo components may be thiazolyl optionally substituted by chlorine, bromine, cyano, nitro, phenyl, $C_1$-$C_2$-alkyl (such as methyl or ethyl), $C_1$-$C_2$-alkoxy (such as methoxy or ethoxy), methylsulfonyl or ethyl-sulfonyl, benzothiazolyl optionally substituted by aminosulfonyl, methylaminosulfonyl, phenoxysulfonyl, and pyridyloxysulfonyl, cyanethylsulfonyl, chlorine, bromine, cyano, methyl, ethyl, methoxy, ethoxy, methylsulfonyl, ethylsulfonyl, and cyanethylsulfonyl, pyrazolyl optionally substituted by cyano, methyl and phenyl, thiadiazolyl optionally substituted by nitro, chlorine, methyl and phenyl, imidazolyl optionally substituted by nitro and methyl, thiophene optionally substituted by nitro and acetyl, imidazole optionally substituted by chlorine, and pyrazole optionally substituted by methyl and phenyl.

The following are given as examples :- 2-aminothiazole, 2-amino-5-nitrothiazole, 2-amino-5-methylsulphonylthiazole, 2-amino-5-cyanothiazole, 2-amino-4-phenylthiazole, 2-amino-4-methyl-5-nitrothiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-thiazole, 3-amino-5-(methyl-, ethyl-, phenyl- or benzoyl)-1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-thio-cyanobenzthiazole, 2-amino-6-nitrobenzthiazole, 2-amino-6-carboethoxybenzthiazole, 2-amino-4(4- or 6-)methylsulphonylbenzthiazole, 2-amino-1,3,4-thiadiazole, 2-amino-1,3,5-thiadiazole, 2-amino-4-phenyl- or -4-methyl-1,3,5-thiadiazole, 2-amino-5-phenyl- or -5-methyl-1,3,4-thiadiazole, 2-amino-3-nitro-5-methylsulphonylthiophene, 2-amino-3,5-bis-(methylsulphonyl)-thiophene, 5-amino-3-methyl-isothiazole, 3- or 4-aminophthalimide The groups $A_1$ and $A_2$ are preferably residues of the formulae

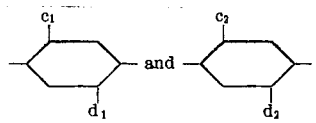

in which $c_1$, $c_2$, $d_1$ and $d_2$ each represents a hydrogen atom or a methyl, ethyl, methoxy, ethoxy, phenylthio or phenoxy residue.

The groups $c_1$ and $c_2$ are preferably bound in orthoposition to the azo group and, in addition to the abovementioned groups, may also represent a chlorine or a bromine atom, a trifluoromethyl group, an alkylsulphonyl group, preferably a methylsulphonyl group and an acylamino group that may be alkylated, preferably methylated, at the nitrogen atom and in which the acyl residue is the residue of an organic monocarboxylic acid, an organic monosulphonic acid, for example, methane-, ethane- or para-toluene-monosulphonic acid, or the residue of a carbamic acid or a carbonic acid monoester or monoamide, for example, phenoxycarbonyl, methoxycarbonyl and aminocarbonyl.

The pairs of substituents $R_1$ and $R_2$, $R'_1$ and $R'_2$ and $R'_3$ and $R'_4$ preferably have the same meaning. They may be hydrogen atoms or low alkyl groups, that is to say, alkyl groups containing one to four, preferably two to four, carbon atoms, for example, methyl, ethyl, n-propyl or n-butyl groups, that may be substituted in the usual manner, for example, halogenated alkyl groups for example $\beta$-chloroethyl, $\beta,\beta,\beta$-trifluoroethyl or $\beta,\gamma$-dichloropropyl $\gamma$-chloro-$\beta$-hydroxypropyl; or by the following groups: $\beta$-cyanoethyl; alkoxyalkyl containing up to eight carbon atoms for example $\beta$-ethoxyethyl, $\delta$-methoxybutyl or $\delta$-butoxybutyl; hydroxyalkyl for example $\beta$-hydroxyethyl, $\beta,\gamma$-dihydroxypropyl; phenylalkyl containing up to eight carbon atoms, for example benzyl or phenethyl, alkoxy carbonylalkyl containing up to eight carbon atoms, for example butoxycarbonylethyl, propoxycarbonylethyl, methoxycarbonylpropyl, fatty acid acylaminoalkyl containing up to 10 carbon atoms, for example $\beta$-(acetyl or formyl)-aminoethyl, butyrylaminopropyl; fatty acid acyloxyalkyl containing up to 10 carbon atoms, for example $\beta$-acetylhydroxyethyl, $\beta,\gamma$-diacetoxypropyl; butyryloxypropyl, hexanoyloxypropl; $\beta$-aryloxy-sulphonylalkyl for example $\beta$-benzenesulphonyloxyethyl or $\beta$-(p-chlorobenzenesulphonyl)-ethyl; alkyl- or arylcarbamoylhydroxyalkyl containing up to seven carbon atoms for example 2-methyl-carbamyloxyethyl, $\beta$-butylcarbamyloxypropyl and $\beta$-phenylcarbamyloxyethyl; alkyloxycarbonyloxyalkyl contianing up to seven carbon atoms, for example $\beta$-(methoxy, ethoxy or isopropoxy)-carbonyloxyethyl, $\gamma$-acetamidopropyl, $\beta$-(p-nitrophenoxy)-ethyl, $\beta$-(p-hydroxyphenoxy)-ethyl, cyanoalkoxyalkyl, e.g., cyanethoxyethyl; $\beta$-carboxyethyl, $\beta$-acetylethyl, $\beta$-diethylaminoethyl, $\beta$-cyanoacetoxyethyl- and $\beta$-benzoyl- or $\beta$-benzoyl- or $\beta$-(p-alkoxy or phenoxybenzoyl)oxyethyl.

The alkyl residues $R_3$ and $R_4$ are, for example, 1,2-alkylene or 1,3-propylene groups or bridging groups of the formula

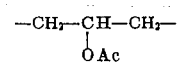

which may be acylated. The acyl residue Ac is the residue of an organic monocarboxylic acid, a monosulphonic acid, a carbamic acid or a carbonic acid monoester or monoamide, for example, an acetyl, formyl, propionyl, benzoyl, stearoyl, methanesulphonyl, ethanesulphonyl, para-toluenesulphonyl, phenoxycarbonyl, methoxycarbonyl, phenylaminocarbonyl, methyl-aminocarbonyl or aminocarbonyl residue.

When the groups $R_1$ or $R_2$ are bound to the group $A_1$ or $A_2$ in ortho-position to form a ring, tetrahydroquinoline or benzomorpholine residues, for example, are present, and the groups of the formulae $A_1$—$NR_1$—$R_3$— and/or —$A_2$—$NR_2$—$R_4$— are then derived, for example from N-$\beta$-hydroxyethyl-1,2,3,4-tetrahydroquinoline, N-$\beta,\gamma$-dihydroxypropyl-1,2,3,4-tetra-hydroquinoline, N-$\beta,\gamma$-dihydroxypropyl-7-methoxy1,2,3,4-tetrahydroquinoline, N-$\beta,\gamma$-dihydroxypropyl-5-acetylamino-1,2,3,4-tetrahydroquinoline, N-$\beta$-hydroxyethyl-2,2,4-trimethyl-1,2,3,4-tetrahydroquinoline, N-$\beta$-hydroxyethylbenzomorpholine and N-$\beta,\gamma$-dihydroxypropyl-5-acetylaminobenzomorpholine.

The groups $R_5$ and $R_6$ are alkyl, aralkyl or cycloalkyl groups, for example methyl, ethyl, propyl, benzyl or cyclohexyl groups or, together with the nitrogen atom that binds them, they form a pyrrolidine, piperidine, $\alpha,\beta$-$\gamma$-methylpiperidine, morpholine, thiomorpholine or tetrahydroisoquinoline ring.

The residue Y is the anion of a strong organic or inorganic acid, for example, -Cl, -Br, -I, =$SO_4$, -$SO_3$-alkyl, -$SO_3$-aryl or -$SO_3$-O-alkyl.

The bifunctional briding group Z is principally a group corresponding to one of the following formulae

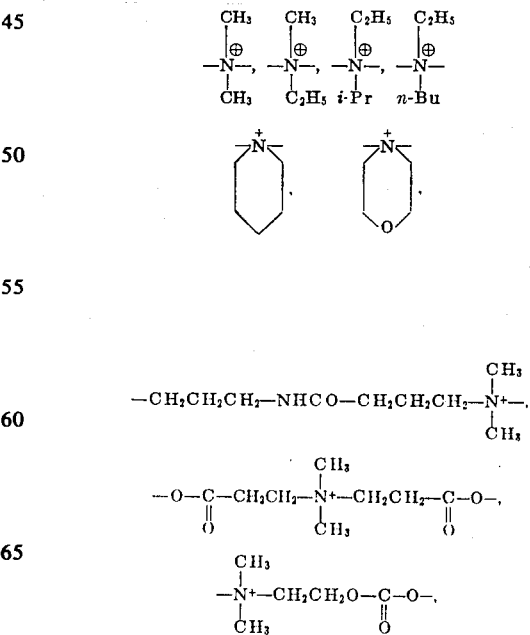

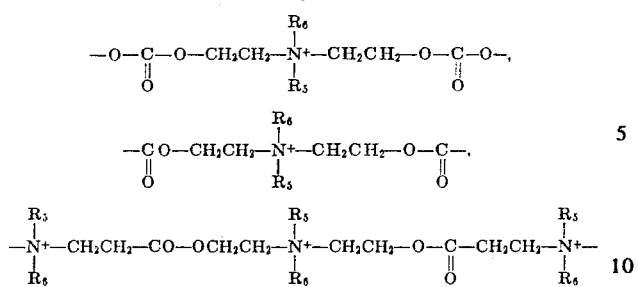

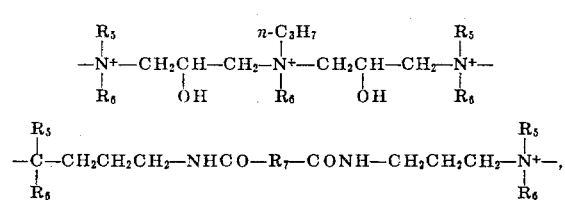

in which $R_7$ is the residue of a dicarboxylic acid freed from the carboxyl groups;

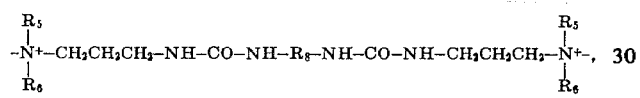

in which $R_8$ is the residue of a diisocyanate freed from the isocyanate groups, and

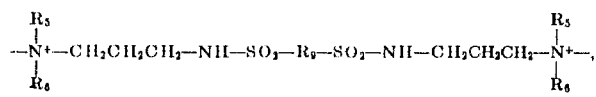

in which $R_9$ is the residue of a disulphonic acid freed from the sulphonic acid groups.

Specially preferred are diazo compounds which contain a monoazo residue of the formula

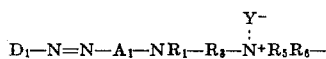

in which $R_1$ and $R_5$ together may constitute an ethylene bridge when the residue $R_3$ represents an ethylene bridge, and especially the disazo dyestuffs of the formulae

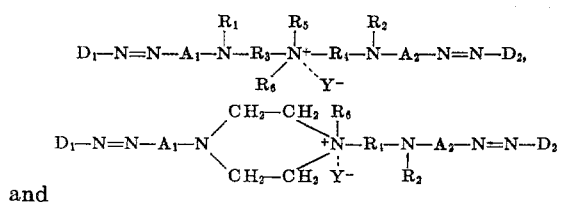

and

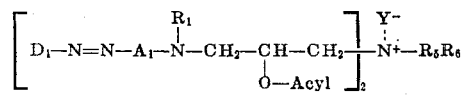

in which the symbols $D_1$, $D_2$, $A_1$, $A_2$, $R_1$, $R_2$, $R_3$, $R_4$, $R_5$, $R_6$ and Y have the meanings ascribed to them in the above formula.

The new dyestuffs may be obtained by a) coupling two coupling components of the formula

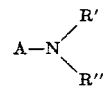

which are linked to each other through a bifunctional bridging group Z which has no dyestuff characteristics and which contains at least one quaternated nitrogen atom, in which formula A represents the residue of an arylene component and R' and R'' each represents an alkyl group, with diazo compounds derived from amines of the formula $D_1$-$NH_2$ and $D_2$-$NH_2$ to form disazo compounds, the symbols $D_1$ and $D_2$ each representing monocyclic or bicyclic residues, or b) reacting two identical or different dyestuffs of the formula

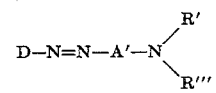

in which D and R' have the meanings given above, A' represents an arylene residue and R''' represents an alkyl group, and in which a reactive substituent is present in one of the residues A' and R''', either simultaneously or successively in two steps with compounds which yield the bifunctional bridging group Z which has no dyestuff characteristics, or c) treating with quaternating agents a disazo compound in which two monoazo dyestuff molecules of the formula

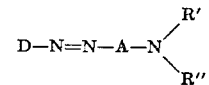

are linked through a bridging group Z which contains at least one nitrogen atom capable of being quaternated and has no dyestuff characteristics.

I Process (a)

A. Coupling components:

The coupling components for use in process a) of the invention are preferably those of the formula

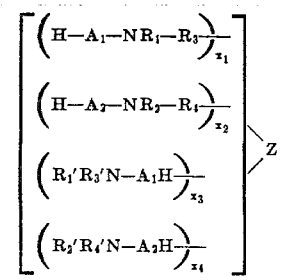

in which $x_1$, $x_2$, $x_3$ and $x_4$ each represents zero or 1 and $x_1 + x_2 + x_3 + x_4 = 2$; $R_1$, $R_2$, $R'_1$, $R'_2$, $R'_3$ and $R'_4$ each represents a hydrogen atom or preferably an alkyl group, and in which when $x_1 = 1$ and/or $x_2 = 1$, $R_1$ may be bound to the residue $A_1$ to form a ring and/or $R_2$ may be bound to the residue $A_2$ to form a ring; $R_3$ and $R_4$ each represents an alkylene group; $A_1$ and $A_2$ each represents a phenylene residue in which the azo gorup and the secondary or tertiary amino group are in 1,4-position to each other and Z is bifunctional bridging group which has no dyestuff characteristics and which contains at least one quaternated nitrogen atom. They may be coupled with diazo compounds derived from amines of the formulae $D_1-NH_2$ and $D_2-NH_2$, in which $D_1$ and $D_2$ have the meanings given below.

The coupling components which may be used in the synthesis of the dyestuffs of the invention are, for example, the compounds corresponding to the following formulae:

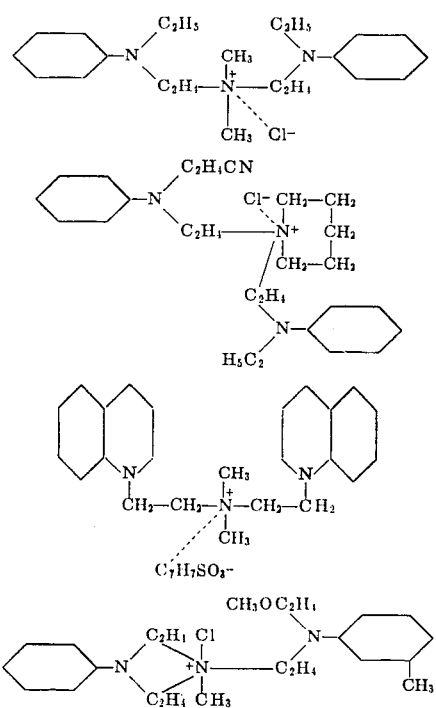

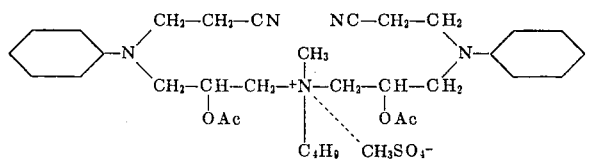

and in which the group Ac represents the residue of an organic monocarboxylic acid:

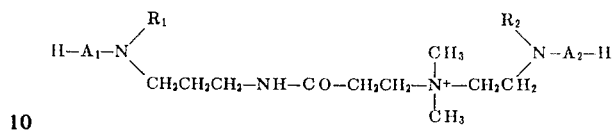

(manufactured, for example, by acylation of an N-(γ-aminopropyl)-H-alkylaniline with a γ-N,N-dimethylaminopropionic acid halide and alkylation of the tertiary amino groups with an N-β-chloroethyl-N-alkylaniline):

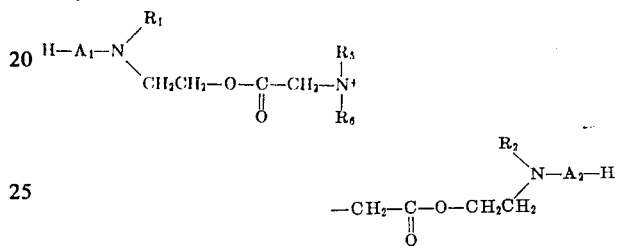

(manufactured, for example, by esterification of 2 mols of N-β-hydroxyalkyl-N-alkylaniline with 1 mol of iminodiacetic acid dichloride and subsequent quaternation of the imino group):

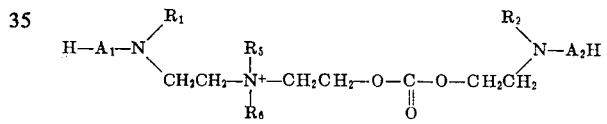

(manufactured, for example, by reacting an N-β-chloroethyl-N-alkylaniline with monoethanolamine, quaternation of the aliphatic nitrogen atom and subsequent reaction with a chloroformic acid ester of an N-β-hydroxyethyl-N-alkylaniline):

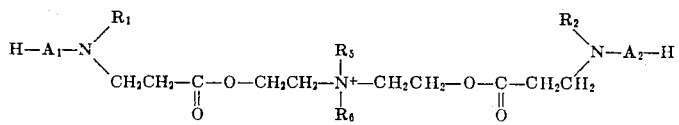

(manufactured, for example, by reacting 2 mols of an acid chloride or chloroformic acid ester of an N-β-carboxyethyl-N-alkylaniline with a diethanolalkylamine and subsequent quaternation):

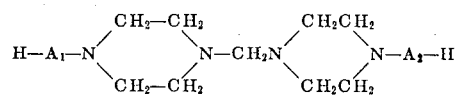

the doubly quarternated coupling components of the formulae

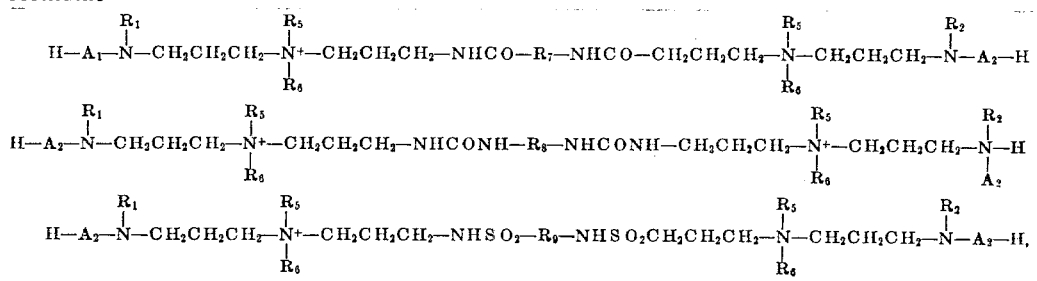

in which $R_7$, $R_8$ and $R_9$ have the meaning given above. These doubly quaternated coupling components may be obtained by reacting 2 mols of the hydrogenated adduct of acrylonitrile and an N-γ-methylaminopropyl-N-alkylaniline of the formula $$H-A_1-NR_1-CH_2CH_2CH_2-N(CH_3)-CH_2CH_2CH_2-NH_2$$

with 1 mol of a dicarboxylic acid or disulphonic acid halide or with 1 mol of a diisocyanate and then quaternating.

Also suitable are the compounds of the formula

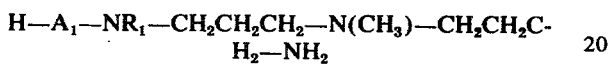

in which $c_1$, $c_2$, $d_1$ and $d_2$ have the meanings given above and X* represents an aliphatic, cycloaliphatic or araliphatic residue, for example, the coupling components indicated in the following Table:

TABLE 1

| No. | $c_1$ | $c_2$ | $d_1$ | $d_2$ | X* |
|---|---|---|---|---|---|
| 1 | H | H | H | H | —$CH_2CH_2$— |
| 2 | H | H | H | H | —$CH_2CH_2CH_2$— |
| 3 | H | H | H | H | —$CH_2CH(OH)CH_2$— |
| 4 | H | H | H | H | —$CH_2CH_2OCH_2CH_2$— |
| 5 | H | H | H | H | —$CH_2CH_2N(CH_3)CH_2CH_2$— |
| 6 | H | H | H | H | —$CH_2CH_2NH—CH_2CH_2$— |
| 7 | H | H | H | H | —$CH_2CH_2SO_2CH_2CH_2$— |
| 8 | H | H | H | H | —$CH_2CH_2SO—CH_2CH_2$— |
| 9 | H | H | H | H | —$CH_2CH_2—S—CH_2CH_2$— | and the trebly quaternated coupling components of the formulae

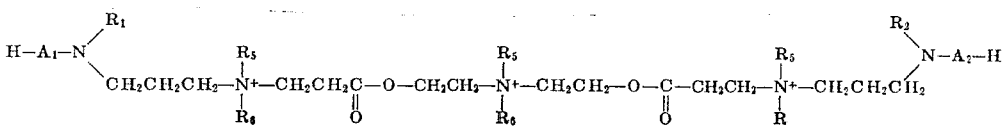

(manufactured, for example, by reacting 2 mols of the adduct of acrylic acid ethylester and an N-γ-amino-N-alkylaniline with diethanolalkylamine and then quaternating):

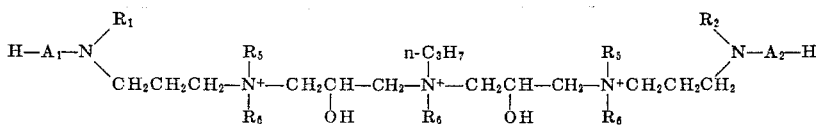

(manufactured, for example, by additively combining 1 mol of N,N-diglycidyl-N-propylamine with 2 mols of N-γ-aminopropyl-N-alkylaniline).

Finally, mention may also be made of the bifunctional coupling components corresponding to the following formulae:

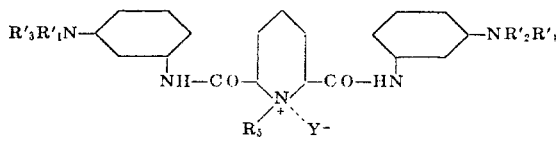

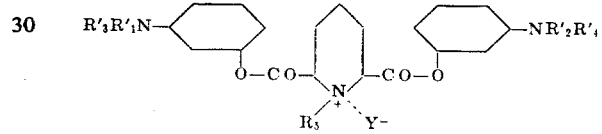

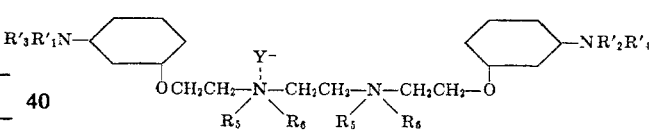

and

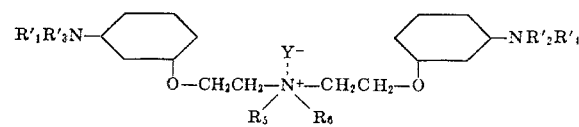

B. Diazo components

The diazo components which may be used are, for example, the amines corresponding with the definition of the diazo residues $D_1$ and $D_2$.

C. Diazotization and coupling:

Diazotization of the above-mentioned diazo components may be effected by known methods, for example, with a mineral acid and sodium nitrite or, for example, with a solution of nitrosylsulphuric acid in concentrated sulphuric acid.

Coupling may also be carried out in known manner, for example, in a neutral to acid medium, if necessary, in the presence of sodium acetate or a similar buffer which influences the rate of coupling, or a catalyst, for example, dimethyl-formamide, pyridine or the salts thereof.

Coupling may also be effected advantageously by combining components in a mixing nozzle. By "mixing nozzle" is meant a device in which the liquids to be mixed are combined with one another in a comparatively small space, whereby at least one of the liquids is conducted through a nozzle, preferably under pressure. The mixing nozzle may be constructed and operated, for example, on the principle of the water jet pump. the supply of one of the liquids to the mixing nozzle corresponding to the supply of water in the water jet pump, and the supply of the other liquid corresponding to the connexion between the water jet pump and the vessel to be evacuated; feed of the liquid through the latter supply route may also be effected under pressure.

Other devices to effect rapid and, if necessary, continuous mixture in a small space may also be used.

After coupling, the non-quaternated dyestuffs that are formed can easily be separated from the coupling mixture, for example, by filtration, because they are virtually insoluble in water. When the dyestuffs obtained are quaternated, they may be salted out.

When a bifunctional coupling component is coupled with less than two mols of a diazonium compound, a mixture of the disazo dyestuffs of the invention and monoazo dyestuffs is formed, and this process is also included in the present invention.

II. Process b)

The new dyestuffs may also be obtained by process b) of the invention in which two monoazo dyestuffs are linked together. One of the two monoazo dyestuffs may already contain a quaternated amino-group, or, preferably, it may be formed during the linking process. To this end, a monoazo dyestuff of the formula

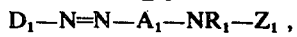

in which $D_1$ $A_1$ and $R_1$ have the meanings given above and the residue $Z_1$ corresponds, for example, to the formula $-R_3-NR_5R_6$, in which $R_3$, $R_5$ and $R_6$ have the meanings given above, is reacted with a monoazo dyestuff of the formula

in which, for example, X represents $-R_4-Y$ and $R_4$ and Y have the meanings given above, together with quaternation to form the disazo dyestuff.

For example, a dyestuff of the formula

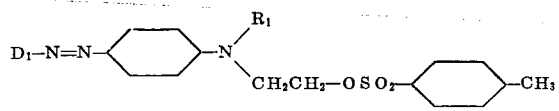

may be reacted with a dyestuff of the formula

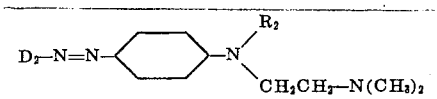

to form a dyestuff of the formula

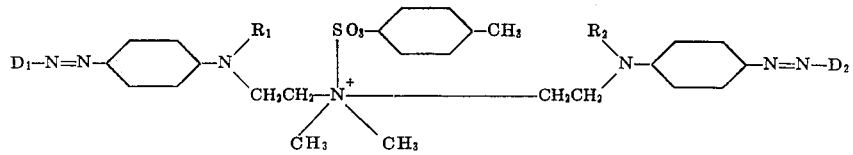

The two halves of the dyestuff may be identical or different. This reaction is carried out under the same conditions as the quaternation described below.

III. Process c)

The new dyestuffs may also be obtained by treating with a quaternating agent one of the dyestuffs described above, in which the symbol Z represents a bifunctional bridging group containing at least one quaternatable nitrogen atom. It is specially advantageous to quaternate the dyestuffs of the formulae

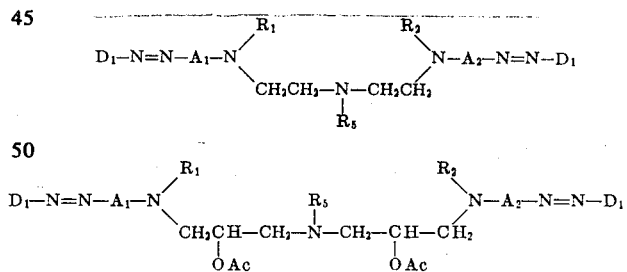

in which the symbols $R_1$, $R_2$, $R_5$, $A_1$, $A_2$, $D_1$, $D_2$ and Ac have the meanings given above.

The dyestuffs of the following formulae may be mentioned as starting materials for the quaternation:

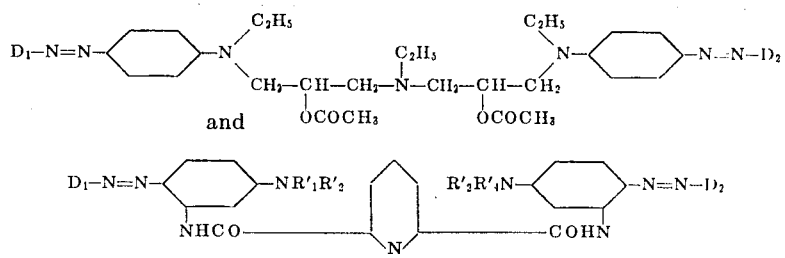

Given that $D_1 = D_2$, the following three sets of conditions may obtain, depending on the quaternatability of the diazo residues $D_1$ and $D_2$ and the quaternatable nitrogen atoms present in the quaternatable residue:

1. The diazo residues $D_1$ and $D_2$ are not quaternatable. This applies, for example, in the case of negatively substituted anilines, when dyestuffs are obtained which can be quaternated only in the bridging group Z.

2. The diazo residues $D_1$ and $D_2$ are more difficult to quaternate than the residue Z'. In this case, the quaternation may be carried out in a manner such that the reaction is discontinued after quaternation of the residue Z'. Alternatively, the quaternating conditions can be intensified, for example, by the addition of an excess of the quaternating agent or by raising the temperature, in a manner such that at least one of the residues $D_1$ and $D_2$ is quaternated in addition to the residue Z.

3. The diazo residues $D_1$ and $D_2$ are more easily quaternatable. In this case, when process c) is adopted, only those dyestuffs in which $D_1$, $D_2$ and Z are quaternated are obtained.

In this process the disazo dyestuffs are quaternated with esters of strong mineral acids or organic sulphonic acids, for example, dimethyl sulphate, diethyl sulphate, alkyl halides, for example, methyl chloride, methyl bromide or methyl iodide, aralkyl halides, for example, benzyl chloride, esters of low-molecular-weight alkanesulphonic acids, for example, the methyl ester of methane-, ethane- or butane-sulphonic acid, and the alkyl esters of (4-methyl-, 4-chloro- or 3- or 4-nitro)-benzene sulphonic acid which, as anions, form halogen, sulphuric acid semi-ester, alkane or benzene sulphonic acid anions.

Quaternation is preferably effected by heating in an inert organic solvent, for example, xylene, carbon tetrachloride, ortho-dichlorobenzene or nitrobenzene. Alternatively, it is possible to use solvents for example acetic anhydride, dimethylformamide, acetonitrile or dimethyl sulphoxide. The quaternatable dyestuffs preferably contain as anion $Y^-$ the residue of a strong acid, for example sulphuric acid or a semiester thereof, or a halogen ion, but they may also be used as double salts, for example, with zinc chloride, or as free bases.

IV. Use

In so far as they are in the form of salts of strong inorganic acids which form more or less neutral aqueous solutions, the azo dyestuffs used in accordance with the invention may be applied in a slightly alkaline, neutral or slightly acid bath. It is advantageous to carry out dyeing in an acidic bath to which the acid required, for example, acetic acid, formic acid, tartaric acid, a naphthalene sulphonic acid, an alkali bisulphate, sulphuric acid, an acidic alkali metal phosphate or phosphoric acid is added at the commencement of the dyeing process, or to which a substance is added which liberates acid during the dyeing process. Substances which produce acid are, for example, salts of volatile bases and strong, non-volatile acids, for example, ammonium sulphate, or water-soluble esters of organic acids, which are saponified during the dyeing process, for example, the methyl or ethyl esters of aliphatic hydroxyacids, for example, lactic, malic or tartaric acid. When mineral acid solutions of the dyestuffs to be used in accordance with the invention are employed, the mineral acid may also be buffered during the dyeing process by the gradual addition of alkali metal salts of weaker acids, for example, sodium acetate. Dyeing may be carried out in an open vessel at the boil or in a closed vessel under superatmospheric pressure at a temperature above 100°C. The azo dyestuffs in accordance with the invention may be used for dyeing and printing a very wide variety of synthetic fibres, for example, polyvinyl chloride, polyamide and polyurethane fibres, and also fibres made from polyesters of aromatic dicarboxylic acids, for example, polyethylene terephthalate fibres; but they are specially useful for dyeing and printing polyacrylonitrile fibres or polyvinylidene cyanide fibres (Darvan). By polyacrylonitrile fibres is meant primarily polymers containing more than 80 percent, for example, 80 to 95%, of acrylonitrile; they may also contain 5 to 20% of vinyl acetate, vinyl pyridine, vinyl chloride, vinylidene chloride, acrylic acid, acrylic acid esters, methacrylic acid, methacrylic acid esters and the like. These products are sold, for example, under the following trade-names: "Acrilan 1656" (The Chemstrand Corporation, Decatur, Alabama, U.S.A.), "Acrilan 41" (The Chemstrand Corporation), "Creslan" (American Cyanamid Company), "Orlon 44" (Du Pont), "Crylor HH" (Soc. Rhodiaceta Sa, France), "Leacryl N" (Applicazioni Chimice Societa per Azioni, Italy), "Dynel" (Union Carbide Chemical Corporation), "Exlan" (Japanese Exlan Industry Co., Japan), "Vonnel" (Mitsubishi, Japan), "Verel" (Tennessee Eastman, U.S.A.), "Zefran" (Dow Chemical, U.S.A.), "Wolcrylon" (Filmrabrik Agfa, Wolfen), "Ssaniw" (U.S.S.R.) and also "Orlon 42", "Dralon," "Courtelle" and so forth.

The new dyestuffs produce on these fibres, which may also be dyed in admixture with one another, intense and level dyeings possessing good fastness to light and good general properties of fastness, especially good fastness to washing, perspiration, sublimation, crease-resist finishing, decatizing, hot-pressing, rubbing, carbonizing, water, sea water, dry cleaning, cross-dyeing and solvents.

The present invention therefore also includes a process for dyeing man-made fibres, for example, fibres made from polyurethanes, cellulose triacetate, cellulose acetate (so-called 2½-acetate), fibres made from linear aromatic polyesters, for example, those made from terephthalic acid and ethylene glycol or 1,4-dimethylol-cyclohexane and copolymers derived from terephthalic and isophthalic acid and ethylene glycol, fibres based on polyepoxides, polyamides, for example, nylon 6, nylon 6.6 or nylon 12 or polyolefine fibres, for example, modified polypropylene, but especially acrylic fibres made from polyacrylonitrile and copolymers of acrylonitrile and other vinyl compounds, for example, acrylic acid, acrylic esters, acrylamides, methacrylic acid, methacrylic esters, methacrylic amides, vinyl pyridine, vinyl chloride or vinylidene chloride, copolymers of dicyanoethylene and vinyl acetate, and also acrylonitrile block polymers, wherein disazo compounds are used in which two monoazo dyestuff molecules of the general formula

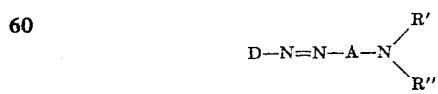

in which D represents the residue of a monocyclic or bicyclic diazo component, A represents an arylene residue and R' and R'' each represents an alkyl residue, are linked together via their coupling components through a bifunctional bridging group Z which has no dyestuff characteristics and which contains at least one quaternated nitrogen atom.

The new dyestuffs of the invention display, inter alia, good stability in a wide pH range and good affinity, for example, in aqueous solutions having different pH values. Furthermore, the new dyestuffs generally show good reservation on wool and other natural or synthetic polyamide fibres.

Generally, the quaternated water-soluble dyestuffs display little sensitivity to electrolytes, and some of them have markedly good solubility in water or organic solvents. Dyeing with the quaternated water-soluble dyestuffs is generally carried out in an aqueous neutral or acid medium at the boil under atmospheric pressure or in a closed vessel under superatmospheric pressure at higher temperatures. The commercially available levelling agents have no adverse effect, but they are not necessary. The dyestuffs mentioned are also very suitable for three-colour dyeing. By virtue of their stability towards hydrolysis, they may be used advantageously for high-temperature dyeing and for dyeing in the presence of wool. They may also be applied to the fibrous materials by printing processes. In this method of application there is used, for example, a printing paste which contains the dyestuff and the adjuvants commonly used in printing, for example, wetting agents and thickeners.

The dyestuffs of the invention are also suitable for colouring polymerization products of acrylonitrile and other plastics by addition to the composition or a solution thereof, prior to the shaping operation, the shades obtained being fast to light and washing.

The following Examples illustrate the invention. Unless otherwise stated, the parts and percentages are by weight.

Preparation of the coupling components

Procedure I

31.9 Parts of N-ethyl-N,2-hydroxyethylaniline-paratoluene-sulphonic acid ethyl ester and 19.2 parts of N-ethyl-N,2-(N',N'-dimethylamino)-ethylaniline are stirred for 3 hours at 90° to 100°C and the honey-coloured liquid which forms is treated with 200 parts of ethyl acetate. The condensation product precipitates in the form of white needles. After cooling, the product is isolated by filtration and washed with a small amount of ethylacetate. The coupling component of the formula

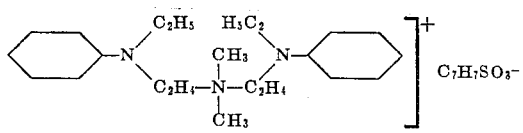

so obtained melts at 123°C.

Further coupling components of this kind may be obtained in an analogous manner by reacting the toluenesulphonic acid esters listed in Column II of the following Table with the tertiary amines shown in Column III.

| I Number | II Toluenesulphonic acid ester of | III Tertiary amine | IV M.P., °C. |
|---|---|---|---|
| 1 | ⟨⟩—N(C₂H₅)(C₂H₄OH) | ⟨⟩—N(C₂H₅)(C₂H₄—N(CH₂—CH₂)(CH₂—CH₂)CH₂) | 141-2 |
| 2 | Same as above | ⟨⟩—N(C₂H₅)(C₂H₄—N(CH₂—CH₂)(CH₂—CH₂)O) | 137-8 |
| 3 | ⟨OCH₃, CH₃⟩—N(CH₃)(C₂H₄OH) with CH₃ | ⟨⟩—N(C₂H₅)(C₂H₄—N(CH₃)(CH₃)) | 128 |

Procedure II

β,γ,β',γ'-Diepoxytripropylamine (prepared in accordance with French Pat. Specification No. 1,137,175) are heated with ethylaniline in chlorobenzene to yield β,β'-dihydroxy-γ,γ'-di(N-phenyl-N-ethyl)-aminotripropylamine. The product is then acetylated with an excess of acetic anhydride and the reaction mixture evaporated in vacuo to yield β,β'-diacetoxy-γ,γ'-di(N-phenyl-N-ethyl)-aminotripropylamine of the formula

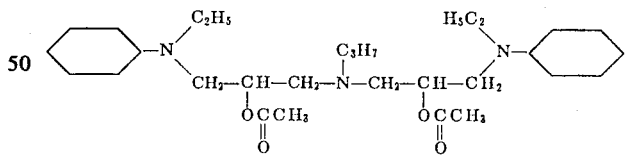

Procedure III

18.4 Parts of N-ethyl-N,2-chloroethylaniline, 41 parts of N-ethyl-N,2'-(N',N'-dimethylamino)-ethyl-1,3-toluidine and 1.5 parts of sodium iodide are stirred for 20 hours at 140° to 145°C. The batch is diluted with 500 parts of water and any unreacted starting material is removed by extraction with ethyl acetate. The aqueous solution of the coupling component, the content of which can be determined by the usual methods, for example, by titration with 4-nitrobenzenediazonium chloride solution, may be used as it is in the manufacture of the dyestuffs. The coupling component corresponds to the formula

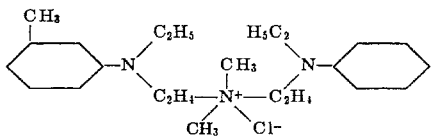

Procedure IV 23.3 Parts of N,2-(N'-phenyl-N'-ethyl)-aminoethyl-piperidine, 10.1 parts of 1,3-dibromopropane and 25 parts of dimethylformamide are stirred for 3 hours at 140° to 145°C until no turbidity forms on dilution with water. The solvent is evaporated in vacuo and the residue is dissolved in 100 parts of water. The solution of the compound of the formula

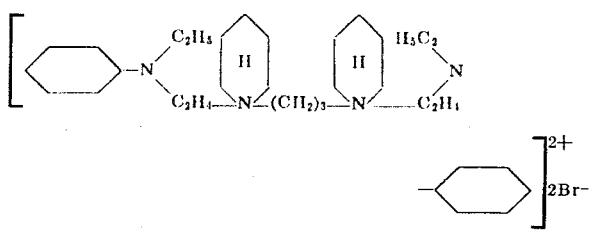

is obtained. A thin-layer chromatogram shows that the solution is free from by-products.

An analogous compound in which the two positively charged nitrogen atoms are linked by a bridge consisting of four methylene groups is obtained when the 1,3-dibromopropane is replaced by 1,4-dibromobutane.

The following bifunctional coupling components may also be obtained in an analogous manner:

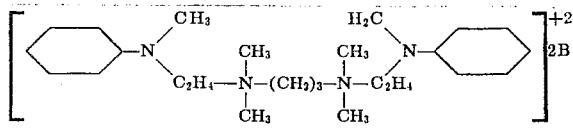

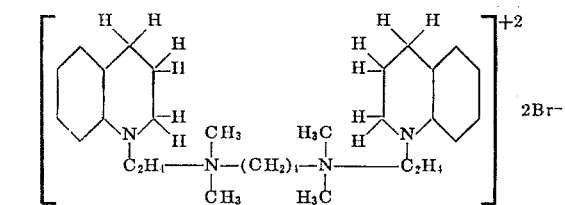

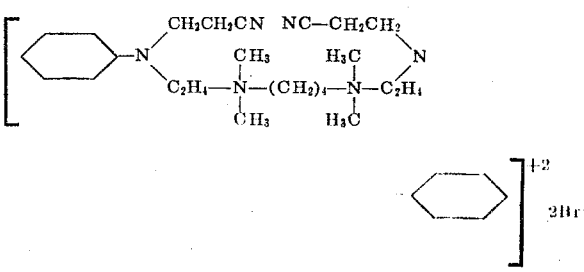

Procedure V

256 Parts of the toluenesulphonic acid ester of N-alkyl-N,2-hydroxyethylaniline, 290 parts of ethanol and 75 parts of 35% aqueous methylamine solution are vigorously heated for 1 hour under reflux. The solvent is evaporated, the residue is taken up in 800 parts of water, 100 parts by volume of 30% sodium hydroxide solution are added, the mixture extracted with chloroform, the chloroform extract is dried with calcined sodium sulphate, the solvent is evaporated and the residue is distilled. The compound of the formula

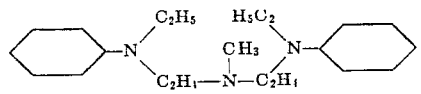

is obtained at 156° to 158°C under a pressure of 0.04 mm Hg.

Procedure VI

64 Parts of the toluensulphonic acid ester of N-ethyl-N,2-hydroxyethylaniline, 17.2 parts of N,N,N',N'-tetramethylhexamethylenediamine and 120 parts of dimethylformamide are heated to 70°C, whereupon the exothermic reaction raises the temperature of the reaction mixture to 120°C. After the reaction subsides, the batch is heated again to the boil and then allowed to cool. The crystal slurry so formed is diluted with 400 parts of ethyl acetate, suction filtered, and the filter residue is washed with ethyl acetate. 79 Parts of the compound of the formula

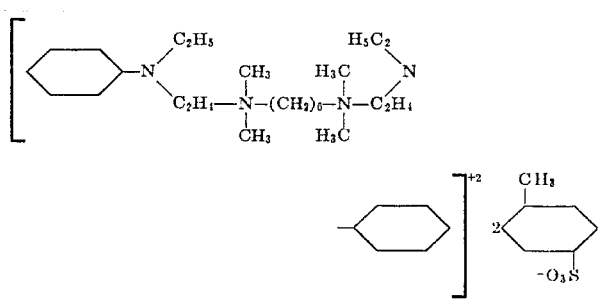

are obtained.

Procedure VII

236 Parts of 3-diethylaminophenol-2'-dimethylamino-ethylether, 108 parts of 1,4-dibromobutane and 200 parts of dimethylformamide are stirred for 12 hours at 120° to 130°C, the mixture is allowed to cool, 400 parts of water are added, and the batch is then stirred until the coupling component crystallizes. The product is isolated by suction filtration, washed with 400 parts of a 10% sodium bromide solution, dried, and the compound of the formula

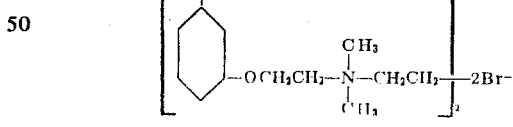

is obtained.

EXAMPLE 1

10.2 Parts of the coupling component prepared in accordance with Procedure I by quaternation of N-ethyl-N,β-(N',N'-dimethylamino)ethylaniline are dissolved in 500 parts of water and 10 parts of glacial acetic acid. A diazo solution prepared from 69 parts of a 10% aqueous paste of 2-chloro-4-nitroaniline by diazotization with sodium nitrite and hydrochloric acid is run into the solution so obtained, the coupling mixture is rendered neutral to Congo red by the addition of sodium acetate crystals, and the batch is stirred at 0° to 5°C until the diazo compound is no longer detectable. The dyestuff, which is sparingly soluble in cold water, is isolated by filtration and dried. When applied in an aqueous bath it dyes polyacrylonitrile fibres a red shade possessing very good fastness to light. The dyestuff corresponds to the formula

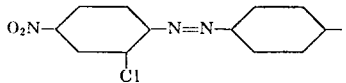

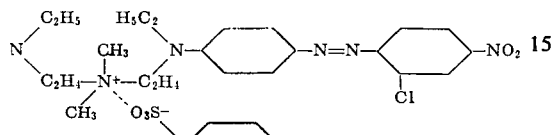

Dyestuffs which yield the shades listed in Column III of the following Table may be obtained by replacing the 2-chloro-4-nitroaniline with the diazo components listed in Column II.

| I | II | III |
|---|---|---|
| 1 | 2-amino-5-nitrobenzonitrile | ruby |
| 2 | 2,6-dichloro-4-nitroaniline | yellowish brown |
| 3 | 4-nitroaniline | orange |
| 4 | 4-amino-3-chlorophenylmethylsulphone | orange |
| 5 | 5-amino-3-phenyl-1,2,4-thiadiazole | red |
| 6 | 2-amino-5-nitrothiazole | bluish violet |

EXAMPLE 2

5.36 Parts of the monoazo dyestuff of the formula

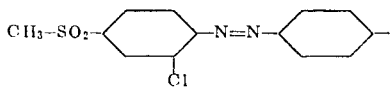

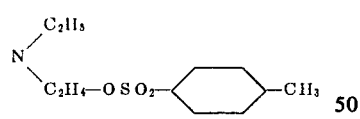

(obtained by coupling diazotized 4-amino-3-chlorophenylmethyl-sulphone with N-ethyl-N,2-hydroxyethylaniline-para-toluene-sulphonic acid ester) and 3.5 parts of the monoazo dyestuff of the formula

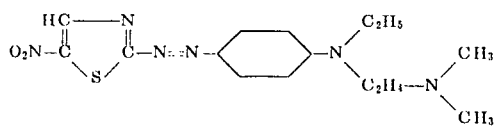

[obtained by coupling diazotized 2-amino-5-nitrothiazole with N-ethyl-N,2-(N′,N′,-dimethylamino)-ethylaniline] and mixed together, the mixture is melted and the melt is kept at 100° to 110°C for 6 hours. After cooling, a small amount of unreacted starting material is removed with ethyl acetate and the residue is recrystallized from 2% acetic acid. A dark dyestuff powder is obtained that dyes polyacrylonitrile fibres an olive-green shade.

Dyeing procedure:

1 Part of the dyestuff so obtained of the formula

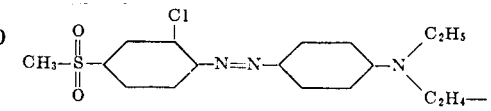

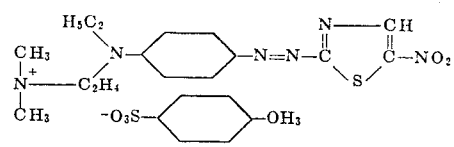

is dissolved in 5,000 parts of water in the presence of 2 parts of 40% acetic acid. 100 Parts of dried polyacrylonitrile staple fibre yarn are entered into this dyebath at 60°C, the temperature is raised to 100°C within half an hour and dyeing is carried out for 1 hour at the boil. The yarn is then well rinsed and dried. An olive-green dyeing possessing very good fastness to light, sublimation and washing is obtained.

EXAMPLE 3

3.3 Parts of 2-cyano-4-nitroaniline are diazotized at 20°C in 20 parts by volume of N nitrosylsulphuric acid and then discharged on to 200 parts of ice. A solution of 4.97 parts of $\beta,\beta'$-diacetoxy-$\gamma,\gamma'$-di-(N-phenyl-N-ethyl)-aminotripropylamine in 50 parts by volume of dimethylformamide is added dropwise to this solution at a temperature not exceeding 10°C, the batch is stirred for 3 hours, neutralized with 30% NaOH and stirred overnight. The dyestuff is isolated by filtration and dried in vacuo. The dyestuff so obtained corresponds to the formula

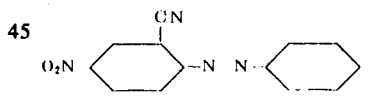

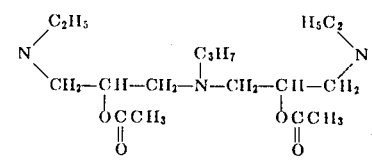

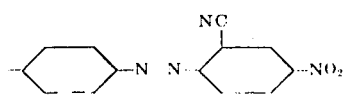

The dried dyestuff of the above formula is then suspended in 50 parts of chlorobenzene, the suspension is heated to 85°C and a small excess of dimethyl sulphate is slowly added. The batch is kept at that temperature for 3 hours, allowed to cool, filtered, and the residue is taken up in water. Finally, the dyestuff of the formula

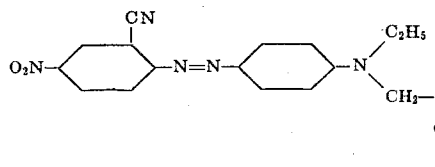 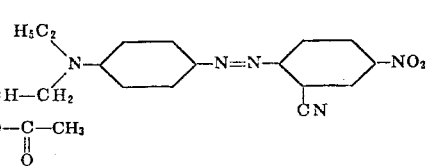

is salted out, isolated by filtration and dried. It dyes polyacrylonitrile a violet shade.

Dyestuffs which dye acrylic fibres the shades listed in Column III of the following Table may be obtained by proceeding in the above manner and coupling the coupling components listed in Column II with the diazo components given in Column I.

TABLE—Continued

| Number | I | II | III |
|---|---|---|---|
| 10 | (structure: dichloro-nitroaniline) | (structure) | Brown. |
| 11 | (structure: chloro-nitroaniline) | (structure) | Red. |
| 12 | (structure: nitro-thiadiazole amine) | (structure) | Reddish blue. |
| 13 | Same as above | (structure with quinoline groups) | Blue. |
| 14 | (structure: phenyl-thiadiazole amine) | (structure) | Scarlet. |
| 15 | $CH_3O_2S$—(ring)—$NH_2$, Cl | (structure) | Yellow. |

EXAMPLE 4

7 Parts of dry sodium nitrite are introduced at 20° to 30°C into 80 parts of sulphuric acid monohydrate. The batch is heated to 60°C, allowed to cool, and then 16.3 parts of 2-amino-5-nitrobenzonitrile are added in portions at 20° to 25°C. The batch is stirred for one hour and then poured on to 300 parts of ice. The clear diazo solution is then run quickly into a solution of 34.4 parts of the coupling component of the formula

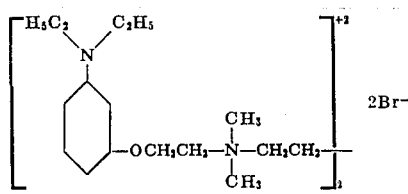

in 300 parts of glacial acetic acid. The batch is neutralized by the addition of 200 parts of sodium acetate crystals at 0°C, diluted with 200 parts of ice water and then stirred for 6 hours at 0° to 5°C. Precipitation of the dyestuff is completed by the addition of 40 parts of sodium bromide. The dyestuff is isolated by suction filtration and dried.

The dyestuff so obtained corresponds to the formula

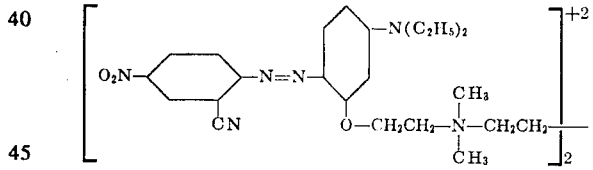

It is readily soluble in hot water and dyes acrylic fibres a violet shade possessing good properties of fastness.

EXAMPLE 5

1 Mol of N-bis-β-hydroxyethyl-3-nitroaniline, together with 2.2 mols of acetic anhydride, are heated for 3 hours at 130°C, the acetic acid is then removed in vacuo and the residue is distilled in a high vacuum. N-bis-β-acetoxyethyl-3-nitroaniline is obtained.

2 Mols of N-bis-β-acetoxyethyl-3-nitroaniline are hydrogenated in 2 litres of absolute ethanol in the presence of Pd/charcoal; the solvent is then removed in vacuo and the residue is distilled in a high vacuum. N-bis-β-acetoxyethyl-3-aminoaniline is obtained.

Preparation of the bifunctional coupling component:

5.1 Parts of pyridine-2,6-dicarboxylic acid chloride in 50 parts by volume of chlorobenzene are added slowly at room temperature to 14 parts of N-bis-β-acetoxyethyl-2-aminoaniline dissolved in 50 parts by volume of anhydrous chlorobenzene. The batch is heated to 80° to 90°C and stirred overnight at that temperature. After cooling, the chlorobenzene is decanted and the residue is triturated with ether. The product is then isolated by filtration and dried.

8.22 Parts of 3-chloro-4-aminophenylmethylsulphone are diazotized in N nitrosylsulphuric acid. The solution so obtained is added dropwise at a temperature not exceeding 10°C to a solution of 13.82 parts of the bifunctional coupling component dissolved in 200 parts by volume of dimethylformamide. The batch is stirred overnight at 0° to 10°C and the dyestuff is precipitated by the addition of ice and water. The dyestuff is isolated by filtration and dried in vacuo, and then 3 parts of the dyestuff so obtained are heated in 75 parts by volume of nitrobenzene at 75°C and stirred until the dyestuff is completely dissolved. 3 Parts by volume of dimethyl sulphate are then dded, the batch is heated to 90°C and then stirred for 5 hours at that temperature. The nitrobenzene is removed by steam and the dyestuff is salted out of the aqueous solution that remains with sodium chloride. The dyestuff is isolated by filtration and dried. It corresponds to the formula which couples bifunctionally is obtained in the form of an oil.

3.88 Parts of 2-amino-6-ethoxybenzthiazole are diazotized at 0° to 5°C in 20 parts by volume of N nitrosylsulphuric acid in the presence of glacial acetic acid/propionic acid, and the solution is then added dropwise at a temperature not exceeding 10°C to a solution of 4.97 parts of the bifunctional coupling component in 200 ml of acetone. The batch is then stirred overnight at 0° to 5°C, neutralized with 30% sodium hydroxide solution and the dyestuff is precipitated by the addition of water. It is isolated by filtration and dried in vacuo.

3 Parts of the dyestuff so obtained are heated to 75°C in 75 parts by volume of nitrobenzene and the batch is stirred until the dyestuff has completely dissolved. 6 Parts by volume of dimethyl sulphate are added, the batch is heated to 90°C and stirred for 5 hours at that temperature. The nitrobenzene is then removed with steam, the aqueous solution which remains is filtered, and the dyestuff in the filtrate is salted out with sodium

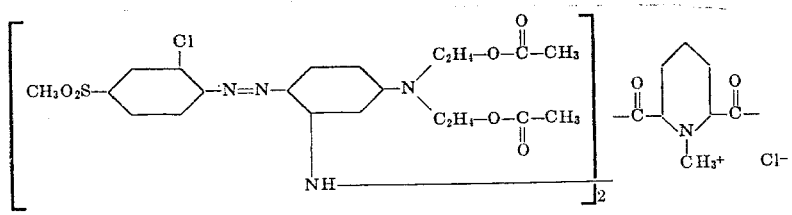 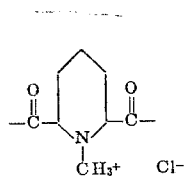

and dyes modified acrylic fibres, nylon-6,6 fibres, wool fabrics and silk a red shade.

chloride. After filtration and drying, a dyestuff of the formula

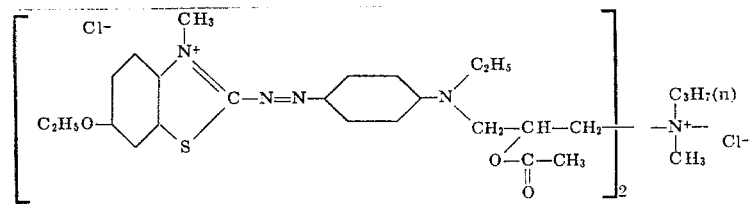

EXAMPLE 6

30 Parts of N-ethylaniline, 17.1 parts of β,γ,β',γ'-diepoxytripropylamine, 30 parts by volume of chlorobenzene and 10 drops of triethylamine are stirred for 30 hours at 140 to 150°C. The solvent is then removed in vacuo and the residue is distilled in a high vacuum. β,β'-Dihydroxy-γ,γ'-di-(N-phenyl-N-ethylamino)-tripropylamine is obtained in the form of a viscous oil.

30 Parts of β,β'-dihydroxy-γ,γ'-di-(N-phenyl-N-ethylamino)-tripropylamine together with 100 parts by volume of acetic anhydride are heated for 3 hours under reflux. The solvent is then removed in vacuo and the residue is distilled in a high vacuum. β,β'-Diacetoxy-γ,γ'-di-(N-phenyl-N-ethyl-amino)-tripropylamine is obtained which dyes polyacrylonitrile a blue shade possessing good properties of fastness.

EXAMPLE 7

The following dyestuffs were prepared as described in Example 1 (Table No. 1-10 and 12-15) or as in Example 6 (Table No. 11) from the diazonium compound obtained from the amines listed in column I and the coupling components listed in column II of the table.

The dyestuffs dyed polyacrylonitrile fibres in the shades given in column III.

TABLE—Continued

| No. | I | II | III |
|---|---|---|---|
| 1 | 2-amino-3-nitro-5-acetyl-thiophene. | [structure] | Violet. |

| No. | I | II | III |
|---|---|---|---|
| 2 | 3-amino-5-nitro-benzoisothiazole. | [structure with B⁻, OCH₃, CH₃, C₃H₆NHCOC₄H₉, H₅C₂] | Blue. |
| 3 | 2-amino-5-nitro-thiazole. | [structure with Br⁻, OCH₃, CH₃, C₃H₆NHCOC₄H₉, H₅C₂] | Blue. |
| 4 | 2-amino-5-nitro-thiazole. | [structure with C₆H₅SO₃⁻, (CH₂)₂—OC₂H₅, C₂H₅, H₃C, NHCOOC₂H₅] | Blue. |
| 5 | 1-phenyl-3-methyl-5-amino-pyrazole. | [structure with Cl⁻, CH₂CH₂CONH₂, H₃C, NHCOCH₃, OCH₃] | Orange. |
| 6 | 3-amino-5-chloro-indazole. | [structure with NCC₂H₄, H₅C₂, NH—COCH₂CH₂—N⁺(CH₃)₂—CH₂CH₂CONH, Cl⁻, C₂H₄CN, C₂H₅] | Yellowish brown. Orange. |
| 7 | 3-amino-pyridine | [structure with NCC₂H₄, H₅C₂, NH—COCH₂CH₂—N⁺(CH₃)₂—CH₂CH₂CONH, Cl⁻, C₂H₄CN, C₂H₅] | Yellowish brown. Orange. |
| 8 | 2-amino-5-nitro-thiazole. | [structure with CH₂CH₂O, H₁₃C₆, CH₃, C₂H₄, C₄H₉, Cl⁻, Cl] | Reddish blue. |
| 9 | 2-amino-5-phenyl-1,3,4-thiadiazole. | [structure with CH₂H₄OC₂H₄CN, NC—H₄C₂, CH₃, C₂H₄, N⁺—(CH₂)₄—N⁺, Cl⁻, Cl⁻] | Red. |
| 10 | 3-amino-1,2,4-triazole. | [(CH₃CO—O—C₂H₄)₂N—⟨⟩—NH—CO—₂ pyridine] | Red (this dyestuff carries 3 negative charges). |
| 11 | 2-amino-6-ethoxy-benzothiazole. | [(CH₃CO—O—C₂H₄)₂N—⟨⟩—NH—CO—₂ pyridine] | Blue (this dyestuff carries 3 negative charges). |

| No. | I | II | III |
|---|---|---|---|
| 12 | 2-amino-6-cyano-benzothiazole. | 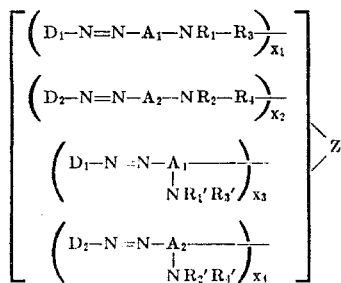 | Violet. |
| 13 | 2-amino-4,6-dinitro-benzothiazole. | Same as above | Blue. |
| 14 | 2-amino-5-phenyl-1,3,4-thiadiazole. | 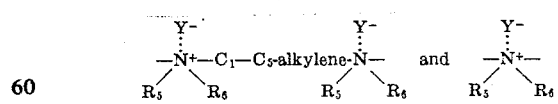 | Red. |
| 15 | 2-amino-4-phenyl-1,3,5-thiadiazole. | Same as above | Red. |

We claim:
1. A disazo dyestuff which corresponds to the formula

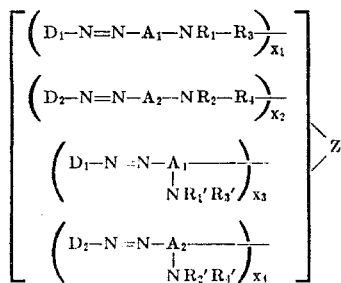

in which $x_1$, $x_2$, $x_3$ and $x_4$ each represents zero or 1 and $x_1 + x_2 + x_3 + x_4 = 2$; $R_1$, $R_2$, $R'_1$, $R'_2$, $R'_3$ and $R'_4$ each represents alkyl containing up to 10 carbon atoms or alkyl containing up to 10 carbon atoms substituted by a member selected from the group consisting of chlorine, bromine, phenoxy, phenyl, $C_1$-$C_{10}$-alkonoyl-oxy, $C_1$-$C_{10}$-alkanoylamino, cyano, $C_1$-$C_4$-alkoxy, benzoyl, cyanethoxy, $C_2$-$C_7$-alkylcarbamoyl, aminocarbonyl and $C_2$-$C_7$-alkyloxycarbonyloxy, and when said $R_1$ is bound to $A_1$ forms tetrahydro-quinoline and when said $R_2$ is bound to $A_2$ forms tetrahydro-quinoline; $R_3$ and $R_4$ each is alkylene of up to three carbon atoms or

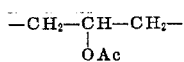

wherein Ac represents alkanoyl of up to three carbon atoms, benzoyl, stearoyl, phenoxycarbonyl, alkoxycarbonyl containing up to five carbon atoms, phenylaminocarbonyl or methylaminocarbonyl; $A_1$ and $A_2$ each is

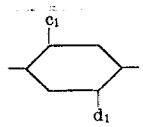

wherein $c_1$ and $d_1$ each represents hydrogen, $C_{1-2}$-alkyl, $C_{1-2}$-alkoxy, acetylamino, phenoxycarbonylamino, methoxycarbonylamino or aminocarbonylamino; the azo group and the dialkylamino group in said formula are attached in para-position to each other; $D_1$ and $D_2$ each represents a member selected from the group consisting of thiazolyl, benzthiazolyl, pyrazolyl, thienyl, thiadiazolyl, imidazolyl, benzimidazolyl, pyridyl, benzisothiazolyl, isothiazolyl, indazolyl, thiazolyl substituted by chlorine, bromine, cyano, nitro, phenyl, $C_1$-$C_2$-alkyl, $C_1$-$C_2$-alkoxy, methylsulfonyl or ethylsulfonyl, benzothiazolyl substituted by aminosulfonyl, methylaminosulfonyl, phenoxysulfonyl, and pyridyloxysulfonyl, cyanethylsulfonyl, chlorine, bromine, cyano, $C_n$-$C_2$-alkyl, $C_1$-$C_2$-alkoxy, methylsulfonyl, ethylsulfonyl, and cyanethylsulfonyl, pyrazolyl substituted by cyano, methyl or phenyl, thiadiazolyl substituted by nitro, chlorine, methyl and phenyl, imidazolyl substituted by nitro or methyl, thienyl substituted by nitro or acetyl, imidazolyl substituted by chlorine, and pyrazolyl substituted by methyl and phenyl selected from the group consisting of (1) —NH—CO—Z'—CO—NH— wherein Z' is pyridinium or azaalkylene having up to six carbon atoms in which the nitrogen atom carries a positive charge;

(2) a group selected from the formulae

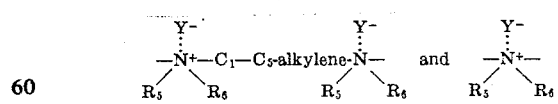

in which $Y^-$ represents an anion and $R_5$ and $R_6$ each are $C_1$-alkyl or together form alkylene, aza-alkylene, oxa-alkylene or triaalkylene of up to five carbon atoms.

2. A disazo dyestuff which corresponds to the formula

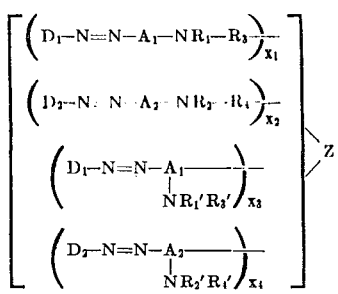

in which $x_1$, $x_2$, $x_3$ and $x_4$ each represents zero or 1 and $x_1 + x_2 + x_3 + x_4 = 2$; $R_1$, $R_2$, $R'_1$, $R'_2$, $R'_3$ and $R'_4$ each represents alkyl of up to four carbon atoms, or alkyl containing up to four carbon atoms substituted by a member selected from the group consisting of chlorine, bromine, phenyl, phenoxy, $C_1$-$C_{10}$-alkanoyloxy, $C_1$-$C_{10}$-alkanoylamino, cyano, $C_1$-$C_{10}$-alkoxy, benzoyl, cyanethoxy, and when said $R_1$ is bound to $A_1$ forms tetrahydro-quinoline and when said $R_2$ is bound to $A_2$ forms tetrahydroquinoline; $R_3$ and $R_4$ each is alkylene of up to three carbon atoms or alkylene substituted with alkylcarbonyloxy containing up to three carbon atoms; $A_1$ and $A_2$ each is phenylene or phenylene substituted with methyl, methoxy, chlorine or acetylamino; the azo group and the dialkylamino group in said formula are attached in para-position to each other; $D_1$ and $D_2$ each represents the residue of a diazo component selected from the group consisting of thiazole, benzothiazole, pyrazole, thiophene, thiodiazole, imidazole, thiazole, benzoimidazole, pyridine, benzoisothiazole, isothiazole or indazole series and Z is selected from the group consisting of (1) —NH—CO—Z′—NH— wherein Z′ is pyridinium or azaalkylene having up to six carbon atoms in which the nitrogen atom carries a positive charge;

(2) a group selected from the formulae

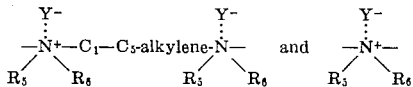 and in which $Y^-$ represents an anion and $R_5$ and $R_6$ each are $C_1$-$C_5$-alkyl or together form alkylene, aza-alkylene, oxa-alkylene or thiaalkylene of up to five carbon atoms.

3. A disazo compound as claimed in claim 1, in which the bridging group Z contains at least one group of the formula

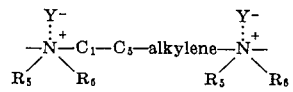

in which $Y^-$ represents an anion and $R_5$ and $R_6$ each are $C_1$-$C_5$-alkyl or together form -$CH_2CH_2CH_2CH_2$-, -$CH_2$-$CH_2$-$CH_2$-$CH_2$-$CH_2$- or -$CH_2CH_2$-$O$-$CH_2CH_2$-.

4. A disazo dyestuff as claimed in claim 1, in which $X_3 = 1$.

5. A disazo dyestuff as claimed in claim 2, in which Z is a residue of the formula

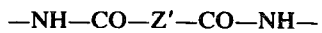

—NH—CO—Z′—CO—NH— wherein Z′ is pyridinium or azaalkylene of up to six carbon atoms in which the nitrogen atom carries a positive charge.

6. A disazo dyestuff as claimed in claim 2, which corresponds to the formula

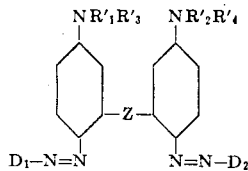

7. A disazo dyestuff as claimed in claim 2, wherein $R_1$ and $R_2$ form tetrahydroquinoline and wherein $R_3$ and $R_4$ are beta-(hydroxy-or $C_1$-$C_3$-alkyl-carbonyl-oxy) propylene.

* * * * *

UNITED STATES PATENT OFFICE
CERTIFICATE OF CORRECTION

PATENT NO. : 3,755,287
DATED : August 28, 1973
INVENTOR(S) : Hegar et al.

It is certified that error appears in the above-identified patent and that said Letters Patent are hereby corrected as shown below:

Claim 1, column 32, line 47, between "phenyl" and "selected", insert -- and Z is --.

Claim 2, column 33, lines 27-31, "the residue of a diazo component....or indazole series"

should read -- a member selected from the group consisting of thiazolyl, benzthiazolyl, pyrazolyl, thienyl, thiadiazolyl, imidazolyl, benzimidazolyl, pyridyl, benzisothiazolyl, isothiazolyl, indazolyl, thiazolyl substituted by chlorine, bromine cyano, nitro, phenyl, $C_1$-$C_2$-alkyl, $C_1$-$C_2$-alkoxy, methylsulfonyl or ethylsulfonyl, benzothiazolyl substituted by aminosulfonyl, methylaminosulfonyl, phenoxysulfonyl, and pyridyloxysulfonyl, cyanethylsulfonyl, chlorine, bromine, cyano, $C_1$-$C_2$-alkyl, $C_1$-$C_2$-alkoxy, methylsulfonyl, ethylsulfonyl, and cyanethylsulfonyl, pyrazolyl substituted by cyano, methyl or phenyl, thiadiazolyl substituted by nitro, chlorine, methyl and phenyl, imidazolyl substituted by nitro or methyl, thienyl substituted by nitro or acetyl, imidazolyl substituted by chlorine and pyrazolyl substituted by methyl and phenyl --

Signed and sealed this 1st day of July 1975.

(SEAL)
Attest:

RUTH C. MASON
Attesting Officer

C. MARSHALL DANN
Commissioner of Patents
and Trademarks